106. COMPOSITIONS, COATING OR PLASTIC.

Patented Sept. 4, 1934

1,972,208

UNITED STATES PATENT OFFICE 1,972,208

COLORED CONCRETE

George R. Tucker, North Andover, Mass.; Charles W. Tucker, administrator of said George R. Tucker, deceased No Drawing. Application December 12, 1932, Serial No. 646,877

17 Claims. (Cl. 106—24)

This invention relates to the coloring of plastic masses such as concrete prepared from the two essential ingredients water and a calcareous substance such as hydraulic cement (e. g. Portland cement), calcined gypsum, lime, clay, or the like, with or without inert bulking or filling materials; and it comprises among its objects the production of more brilliant hues than have formerly been attainable in materials of this character, a reduction in the quantity of pigment essential to produce a given color intensity, and the production of colored objects of the type described with no such diminution in strength as has heretofore accompanied the introduction of pigments thereinto.

It is well known that the introduction of many finely divided pigments into concrete results in a greater reduction in strength than the bulking influence of the structurally inert pigment occasions. It is also well known that pigments usually possess less tinctorial power when used in concrete than when employed in more compatible environments. Furthermore, some of the insoluble coloring materials which for most purposes possess by far the greatest tinctorial or coloring power are precluded from use in concrete because of the extraordinary extent to which they decrease the strength of the hardened material. An excellent example of this latter class of substances is carbon black which, when used in amounts equal to 3–5% of the weight of the calcareous constituent, e. g. Portland cement, of the concrete, effects about a 30% reduction in the compressive strength of the hardened concrete.

I have discovered that colored concretes possessing greater brilliancy, greater color intensity for a given quantity of pigment, and greater strengths than have heretofore been possible under otherwise like conditions may be obtained with the aid of a small amount of a soluble derivative, or even the free sulfonic acid, of a sulfonic acid chosen from a certain class of aromatic sulfonic acids. This class broadly embraces the compounds of the general structure obtained by condensing sulfonic acids of aromatic hydrocarbons or their derivatives, with formaldehyde or its equivalent. These compounds may be looked upon as derivatives of polyaryl alkyls or their homologues and may be expressed by the general graphical formula (A—R—A') SO₃M in which A and A' designate two or more aromatic groups—which may or may not be alike; which are joined to an aliphatic nucleus R which may consist of a single alkyl group or a plurality of alkyl groups associated in straight chain or branched chain formation; and in which SO₃M designates at least one solubilizing group such as the free sulfonic acid group or a sulfonic acid group in combination with a soluble salt-forming radical. The members of the class may be synthesized either by direct sulfonation of a hydrocarbon or a derivative thereof which possesses the necessary configuration of at least two aromatic nuclei joined to an aliphatic nucleus, or, as is usually more convenient and commercially practical, by causing an aromatic sulfonic acid or a derivative thereof to react with formaldehyde or its equivalent, preferably in the ratio of approximately two mols of aromatic sulfonic acid for each mol of aldehyde. The member of the family which I prefer to employ because it is cheap and very effective for present purposes may be obtained by condensing beta-naphthalene sulfonic acid with formaldehyde. While the beta-naphthalene sulfonic acid condensation product may be prepared in known ways, I find that the product obtained by following the procedure set forth in my co-pending application Serial No. 643,743, filed November 21, 1932, and given below possesses highly satisfactory properties for use in practicing my invention.

To 100 parts of concentrated sulfuric acid (specific gravity 1.84) contained in a suitable sulfonator and maintained at 160° C. are added slowly with stirring 100 parts of refined naphthalene. After all of the naphthalene has been introduced (this operation generally requires about one hour), the mass is stirred at 160° C. for four hours longer or until a test shows that substantially none of the naphthalene remains unsulfonated. The sulfonation mixture is then cooled to about 100° C. and diluted with 44 parts of water to prevent solidification on subsequent cooling. The diluted material is further cooled to 80° C. at which temperature 12 parts of a 40% aqueous solution of formaldehyde are added. This mixture is then stirred for three hours longer at 80° C.; but at the end of each successive hour there are added 12 parts more of formaldehyde solution, making a total at the end of the three hours of four portions or 48 parts in all. After all the formaldehyde has been added, the temperature is progressively raised over a period of one hour to 95–100° C. where it is maintained for 18 hours, while the mass is constantly stirred, or until the control test described later on in this specification shows that a product of optimum effectiveness has been obtained. Experience has shown that when pure naphthalene is used, a final heating period of 18 hours yields the best product. Soon after the temperature has been raised to 95–100° C., it is found that substantially none of the aldehyde remains unconsumed in the condensation reaction. During the later stages of the 18-hour heating period, the mixture progressively thickens until at the end it generally reaches the consistency of thick molasses. If this thickening becomes so great, however, as to prevent proper stirring, a small quantity of water may be added to keep the material liquid. After the heating is completed, the mixture is cooled, neutralized with a suitable alkali, e. g. sodium hydroxide, and, if desired, dried. It is then ready for use.

A somewhat purer and better product can be obtained by diluting the viscous reaction mass with about three times its volume of water (the amount is not important so long as it is sufficient to permit convenient handling in the subsequent filtering operation), and neutralizing with lime. For the latter purpose I generally use an aqueous paste or suspension of hydrated or slaked lime. The neutralized slurry is filtered hot to remove the calcium sulfate precipitate which forms from the interaction of the lime and sulfuric acid unconsumed in the sulfonation reaction; and to the filtrate is added the requisite amount of sodium carbonate quantitatively to convert the calcium salt of the desired sulfonic acid into its sodium salt. The resulting calcium carbonate precipitate may then be removed by filtration and the filtrate which contains the desired ingredient evaporated to dryness according to any of the well known drying procedures.

The sulfonation of the naphthalene may be conducted in a cast iron vessel; but the reaction with formaldehyde is preferably carried out in enameled or lead-lined apparatus.

In place of naphthalene in the foregoing sulfonation and condensation procedure may be employed, as more fully described in the previously mentioned co-pending application, any aromatic hydrocarbon such as benzene, diphenyl, anthracene, phenanthrene, fluorene, etc., or any homologue or derivative thereof. When such substitutions are made, however, it is generally necessary to modify the sulfonation and condensation procedure; but these modifications, which vary with each compound, will be apparent to those skilled in the art. Products derived from the benzene series, however, are less effective than materials derived from polynuclear aromatic hydrocarbons or their derivatives. Alkylated aromatic compounds such, for example, as afforded by the sulfonic acids of xylene, cumene, ethyl naphthalene, or retene generally lead to products which are more effective than similar but unsubstituted compounds. Thus the condensation product obtained from xylene sulfonic acid is more effective for present purposes than the one obtained from the simpler benzene derivative. But whereas condensation products prepared from alkylated compounds are especially desirable for use in the broader aspects of this invention, they may be objectionable for some purposes because, due to their tendency to reduce the surface tension of water, they promote the formation of foam in the wet colored concrete. Materials made from aromatic compounds which are free from substituting alkyl groups have substantially no tendency to reduce the surface tension of water; and for this reason colored concretes prepared with them do not have the undesirable tendency to form foam in the wet state possessed by colored concretes prepared with the aid of prior pigment dispersing agents which, unlike present materials, generally rely for their effectiveness on their ability to reduce the surface tension of water. The product obtained as described above by the reaction of naphthalene sulfonic acid with formaldehyde is specifically recommended for use in a preferred form of this invention where the tendency to produce foam is objectionable.

In the chemical reaction which occurs between an aromatic sulfonic acid and formaldehyde or its equivalent, it is my theory that the initial condensation reaction is follower by a progressive polymerization of the resulting condensed material, and that a certain optimum molecular weight is necessary to yield the best results for present purposes as determined according to the indicated empirical test given later on in this specification; but this theory forms no part of my definition and I do not desire to be bound by it.

Whereas I commonly use and particularly recommend the use of the sulfonic acid in the form of its sodium salt, any salt or derivative which is soluble in the aqueous environment of concrete, or even the free acid, may be employed. Thus, for example, the calcium salt is sufficiently soluble for present purposes and may sometimes be used with advantage because it is cheaper to prepare and is quite compatible with concrete which itself may normally contain water-soluble calcium salts. I wish it to be understood, however, that when I specify a soluble compound or derivative, I intend to denote a material which is soluble in the aqueous environment of concrete; and the generic term "derivative" I intend to comprise the specific chemical class of materials known as salts.

In the practice of my invention the active agent, which may be any one chosen from the broad class defined above, may be added in the dry powdered condition to the finely divided pigment and the dry mixture added to the ingredients in the concrete mixer in the usual manner; or the two constituents may be added separately to the concrete mix such as when the agent is dissolved in the mixing water and the dry pigment added to the other dry ingredients; or the dry coloring material and agent may be mixed or ground with the calcareous substance in the process of its manufacture, e. g. they may be ground with Portland cement clinker or with the finished cement at the mill; or the pigment may be added to the concrete ingredients as an aqueous slurry or paste prepared with the aid of one of the above described agents. An advantageous result is obtained in every case; but I prefer the procedure wherein the pigment and agent are incorporated with the dry calcareous substance in the process of its manufacture, e. g. where the addition is made to tube mills in which Portland cement is ground. When the coloring material is added as an aqueous paste, it is desirable to prepare the paste by grinding the pigment as in a ball or colloid mill in the presence of a solution of the active agent. Other methods or modifications of the indicated methods of incorporating the coloring material in accordance with this invention will be apparent to those skilled in the art.

This invention is not equally well adapted for use with all pigments. It is most effective with very finely divided pigments such as carbon black which are of strictly colloidal dimensions and which tend to form groups or aggregates when stirred into water; and it is least effective with coarse pigments which respond only slightly, if at all, to colloid forces. The extent to which any pigment is benefited may be judged without resort to the actual practice of this invention from the improvement in fluidity which the added agent occasions in the pigment paste of the test described above. If the increase in fluidity is large, the process of this invention will correspondingly greatly enhance the coloring or tinctorial power of the pigment when used in concrete; but if the increase in fluidity is relatively slight, the improvement afforded hereunder will be correspondingly small. Similarly, the degree of improvement may be predicted from a comparison under the microscope of two exactly similar aqueous pigment dispersions except that one contains the added agent. If the latter material causes the pigment particles to exist as individually dispersed particles engaged in Brownian movement, whereas in the absence of the agent the particles are aggregated and "dead", i. e. display little or no Brownian motion, the process of this invention possesses advantages for use with the pigment under observation. Besides carbon black, my discovery has proved especially effective for use with the various colored finely divided iron oxides or ochres and the pigments such as the lakes which are, in the process of their manufacture, precipitated as finely divided materials from aqueous media.

The appropriate quantity of any agent selected from the defined class to be used for any given pigment may be ascertained by the following simple test. The exact amount of water required to convert 100 grams of the pigment into a stiff relatively dry paste or dough (of chosen consistency) is carefully determined. The precise consistency chosen is not important as it is merely to be used for comparative purposes; but the water-pigment ratio must be accurately adhered to throughout the entire series of comparative tests described below. In like portions of water as ascertained above are then dissolved progressively ascending amounts of the agent to be tested, for example 1-, 2-, 3-, 4-, and 5-gram portions respectively. To each of these solutions is then added 100 grams of pigment and the mixture kneaded or stirred in a manner simulating as closely as possible the procedure employed in the original preparation of the pigment-water mixture, the consistency of which is to serve as the standard of comparison. The effect of the added ingredient is to increase the fluidity of the pigment paste and that minimum quantity of agent should be chosen which is essential to produce the maximum improvement in fluidity. A larger quantity of agent is not harmful but possesses no particular advantage. For most purposes it will be found that 1-4 parts of the active agent for every 100 parts of the pigment will give the best results. As previously stated, this test is also useful to ascertain and control the optimum degree of polymerization of products made according to the general preparative procedure given above as well as to determine the relative value for present purposes of any material which falls within the scope of the appended claims.

Colored concrete prepared with the aid of this invention possesses a brighter and deeper hue than do otherwise similar materials. Thus, for example, a concrete which contains 3% of carbon black together with one of the above described agents is quite equal in depth of hue to one which contains 5% introduced without the aid of this invention and the former has a brighter and glossier appearance than the latter. Similarly, 4% of red iron oxide incorporated in accordance herewith is equivalent to 6% without the aid of one of the stated agents.

But the process of this invention not only enables the production of deeper and brighter hues than are otherwise obtainable under like conditions; but it also substantially offsets in some manner which is not fully understood, for, as explained in my copending applications Serial No. 643,740, No. 643,741, and No. 643,742, filed November 21, 1932, and Serial No. 646,876, filed December 12, 1932, the agents employed herein do not per se necessarily increase the strength of concrete, the abnormal decrease in strength which many finely divided pigments occasion when introduced into concrete. Whereas a quantity of carbon black equal to 3-5% of the weight of the cement constituent generally decreases the strength of concrete about 30%, the incorporation of the carbon black together with an agent selected from the above defined class offsets the abnormal decrease in strength which would otherwise occur.

There is another reason, however, why colored concrete prepared with the aid of this invention is stronger or of better quality than otherwise similar materials. The agents which I employ to enhance the tinctorial power of pigments when used in concrete have a beneficial influence on concrete itself irrespective of whether coloring materials are present or not. This general improvement forms the subject matter of my copending application Serial No. 643,741, filed November 21, 1932. It consists in an increase in the fluidity and workability of the plastic material which enables it to be handled more easily, or, when it is desired to work to a given workability or slump (a well known measure of workability used in the trade), permits either a reduction in the quantity of mixing water with a well known accompanying increase in strength or the employment of a leaner mix while the desired water ratio and workability or slump are maintained. All these advantages also obtain in the present invention. Hence colored concretes prepared hereunder to a given formula are more workable and fluid than otherwise similar materials prepared according to the same formula; or colored concretes made to a given workability by decreasing the amount of mixing water are stronger than otherwise like masses made to the same workability; or colored concretes mixed to a given water ratio and workability by employing additional aggregates are cheaper than those made to the same water ratio and workability without the advantages of this invention and are fully equal to the latter in strength.

I am aware that protective colloids such as glue and casein have been added to pigments to improve their tinctorial power when used in aqueous media; but none of these, so far as I am informed, is particularly effective for use with pigments which are to be used in concrete. The reason for this is believed to be due to the fact that soluble constituents of concrete such as calcium or magnesium ions react with the ordinary protective colloids to offset or destroy their protective influence. Furthermore, colloids of the mentioned class are generally objectionable for use with concrete because, as is well known, they usually injure the compressive strength thereof. In contradistinction to this, the agents which I employ are not markedly adversely influenced by any of the constituents of concrete, and do not exert an injurious influence on the compressive strength of hardened concrete; and whereas it is thought that the advantages of this invention accrue from the dispersing effect of the herein described agents upon the pigment particles, the behavior of these agents is anomalous if this hypothesis is correct, because the usual dispersing agents are not satisfactory for my purposes.

The term "concrete" as employed herein is used in a broad generic sense which is intended to cover the initially plastic building materials, whether in the fresh condition or the hardened state, which are prepared from the two essential ingredients water and a calcareous substance such as hydraulic cement (e. g. Portland cement), calcined gypsum, lime, clay, or the like, with or without bulking or filling materials such as sand, gravel, crushed stone, coke, asbestos, and all kinds of fibrous material, etc., commonly used in articles of this character. And the term "formaldehyde" is used in the appended claims is intended to include as obvious chemical equivalents thereof compounds which are known to liberate, or act in the same way as, formaldehyde under the reaction conditions described in this specification or which are known to provide reactive methylene groups like the methylene group in formaldehyde.

It should be understood that the present disclosure is for the purpose of illustration only, and this invention includes all modifications and equivalents which fall within the scope of the appended claims.

I claim:

1. The process of preparing colored concrete which comprises mixing water, a calcareous substance, and a finely divided coloring material in the presence of a soluble compound obtained by condensing formaldehyde with an aromatic sulfonic acid.

2. The process of preparing colored concrete which comprises mixing water, a calcareous substance, and a finely divided coloring material in the presence of a soluble compound obtained by condensing formaldehyde with an aromatic sulfonic acid which contains at least eight carbon atoms.

3. The process of preparing colored concrete which comprises mixing water, a calcareous substance, and a finely divided coloring material in the presence of a soluble compound obtained by condensing formaldehyde with a polynuclear aromatic sulfonic acid.

4. The process of preparing colored concrete which comprises mixing water, a calcareous substance, and a finely divided coloring material in the preesnce of a soluble compound having a general chemical structure characterized by a plurality of aromatic nuclei joined to an aliphatic nucleus.

5. The process of preparing colored concrete which comprises mixing water, hydraulic cement, and a finely divided coloring material in the presence of a soluble compound obtained by condensing formaldehyde with an aromatic sulfonic acid.

6. The process of preparing colored concrete which comprises mixing water, hydraulic cement, and carbon black in the presence of a soluble compound obtained by condensing formaldehyde with an aromatic sulfonic acid.

7. As a new composition of matter, colored concrete which contains a finely divided coloring material and a soluble compound obtained by condensing formaldehyde with an aromatic sulfonic acid.

8. As a new composition of matter, colored concrete which contains a finely divided coloring material and a soluble compound obtained by condensing formaldehyde with an aromatic sulfonic acid which contains at least eight carbon atoms.

9. As a new composition of matter, colored concrete which contains a finely divided coloring material and a soluble compound obtained by condensing formaldehyde with a polynuclear aromatic sulfonic acid.

10. As a new composition of matter, colored concrete which contains a finely divded coloring material and a soluble compound having a general chemical structure characterized by a plurality of aromatic nuclei joined to an aliphatic nucleus.

11. As a new composition of matter, colored concrete which is prepared from hydraulic cement and which contains a finely divided coloring material and a soluble compound obtained by condensing formaldehyde with an aromatic sulfonic acid.

12. As a new composition of matter, colored concrete which is prepared from hydraulic cement and which contains carbon black and a soluble compound obtained by condensing formaldehyde with an aromatic sulfonic acid.

13. As a new composition of matter, a dry mixture which contains a calcareous substance, a finely divided coloring material, and a soluble compound obtained by condensing formaldehyde with an aromatic sulfonic acid.

14. As a new composition of matter, a dry mixture which contains a calcareous substance, a finely divided coloring material, and a soluble compound obtained by condensing formaldehyde with an aromatic sulfonic acid which contains at least eight carbon atoms.

15. As a new composition of matter, a dry mixture which contains a calcareous substance, a finely divided coloring material, and a soluble compound obtained by condensing formaldehyde with a polynuclear aromatic sulfonic acid.

16. As a new composition of matter, a dry mixture which contains a calcareous substance, a finely divided coloring material, and a soluble compound having a general chemical structure characterized by a plurality of aromatic nuclei joined to an aliphatic nucleus.

17. As a new composition of matter, a dry mixture which contains hydraulic cement, a finely divided coloring material, and a soluble compound obtained by condensing formaldehyde with an aromatic sulfonic acid.

GEORGE R. TUCKER.